US009490548B2

(12) United States Patent
Weissman et al.

(10) Patent No.: US 9,490,548 B2
(45) Date of Patent: Nov. 8, 2016

(54) WIRELESS DEVICE WITH ANTENNA ARRAY AND SEPARATE ANTENNA

(71) Applicant: QUALCOMM Incorporated, San Diego, CA (US)

(72) Inventors: Haim Mendel Weissman, Haifa (IL); Lior Raviv, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 13/777,768

(22) Filed: Feb. 26, 2013

(65) Prior Publication Data
US 2014/0242918 A1 Aug. 28, 2014

(51) Int. Cl.
*H01Q 21/28* (2006.01)
*H01Q 3/26* (2006.01)
*H01Q 25/00* (2006.01)
*H04W 16/28* (2009.01)
*H04B 7/06* (2006.01)
*H04B 7/08* (2006.01)

(52) U.S. Cl.
CPC ............... *H01Q 21/28* (2013.01); *H01Q 3/26* (2013.01); *H01Q 3/267* (2013.01); *H01Q 25/002* (2013.01); *H04W 16/28* (2013.01); *H04B 7/0617* (2013.01); *H04B 7/0689* (2013.01); *H04B 7/0871* (2013.01)

(58) Field of Classification Search
None
See application file for complete search history.

(56) References Cited

U.S. PATENT DOCUMENTS

| 4,317,118 | A | * | 2/1982 | Corzine et al. | 342/350 |
| 6,208,287 | B1 | * | 3/2001 | Sikina et al. | 342/174 |
| 6,252,542 | B1 | * | 6/2001 | Sikina et al. | 342/174 |
| 6,252,560 | B1 | | 6/2001 | Tanaka et al. | |

(Continued)

FOREIGN PATENT DOCUMENTS

| EP | 1237291 A2 | 9/2002 |
| EP | 1482655 A2 | 12/2004 |

OTHER PUBLICATIONS

Ambresh et al, Compact omni-directional patch antenna for S-band frequency spectra, 2011.*

(Continued)

*Primary Examiner* — Ping Hsieh
*Assistant Examiner* — James Yang
(74) *Attorney, Agent, or Firm* — Linda G. Gunderson

(57) ABSTRACT

An apparatus (e.g., a wireless device) includes an antenna array and a separate antenna. The antenna array includes a plurality of antenna elements having a first antenna beam. The separate antenna includes an antenna element having a second antenna beam. The antenna element of the separate antenna is separate from the antenna elements of the antenna array. The antenna array and the separate antenna are active at different times in an operational mode. The antenna array may transmit and the separate antenna may be inactive in a transmit mode. The separate antenna may receive and the antenna array may be inactive in a receive mode. The antenna array may receive and the separate antenna may transmit in a test mode. Alternatively, the antenna array may transmit and the separate antenna may receive in the test mode.

18 Claims, 12 Drawing Sheets

(56) References Cited

U.S. PATENT DOCUMENTS

| | | |
|---|---|---|
| 7,508,343 B1 | 3/2009 | Maloratsky et al. |
| 8,085,189 B2* | 12/2011 | Scott .............................. 342/174 |
| 8,144,051 B2 | 3/2012 | Lok et al. |
| 2003/0003881 A1* | 1/2003 | Anim-Appiah et al. ..... 455/101 |
| 2007/0004340 A1 | 1/2007 | Kumano et al. |
| 2008/0130603 A1* | 6/2008 | Wentink et al. .............. 370/338 |
| 2009/0153394 A1* | 6/2009 | Navarro et al. .............. 342/174 |
| 2009/0315774 A1* | 12/2009 | Son et al. ...................... 342/372 |
| 2010/0015919 A1* | 1/2010 | Tian .............................. 455/41.2 |
| 2010/0120369 A1 | 5/2010 | Ko et al. |
| 2010/0157955 A1* | 6/2010 | Liu .................. H04W 72/0446 370/336 |
| 2011/0148706 A1 | 6/2011 | Eom et al. |
| 2012/0077446 A1 | 3/2012 | Kahrizi et al. |

OTHER PUBLICATIONS

Molisch et al, TX-RX diversity system, 2003.*
Harty, Noval design of a wideband array, 2010 https://www.wpi.edu/Pubs/ETD/Available/etd-011411-110214/unrestricted/Thesis_Final.pdf.*
International Search Report and Written Opinion for International Application No. PCT/US2014/017767, ISA/EPO, Date of Mailing Jun. 10, 2014, 10 pages.

* cited by examiner

WIRELESS DEVICE WITH ANTENNA ARRAY AND SEPARATE ANTENNA

BACKGROUND

I. Field

The present disclosure relates generally to electronics, and more specifically to a wireless device.

II. Background

A wireless device (e.g., a cellular phone or a smart phone) may include a transmitter and a receiver coupled to an antenna to support two-way communication. For data transmission, the transmitter may modulate a local oscillator (LO) signal with data to obtain a modulated signal, amplify the modulated signal to obtain an output radio frequency (RF) signal having the proper power level, and transmit the output RF signal via the antenna to a base station. For data reception, the receiver may obtain a received RF signal via the antenna and may condition and process the received RF signal to recover data sent by the base station.

A wireless device may include a number of antenna elements and associated transmit and receive circuits to support data transmission and reception. The transmit and receive circuits may be designed to meet specifications but may have performance that can vary widely due to variations in manufacturing, temperature, power supply voltage, etc. It may be desirable to test/calibrate the transmit and/or receive circuits in order to ensure good performance even in the presence of these variations.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

A wireless device with an antenna array and a separate antenna is disclosed herein. The antenna array may be used for data transmission and/or data reception and may have a first antenna beam, which may be obtained with beamforming. The separate antenna may be used for data transmission and/or data reception, discovery of other stations, and testing or calibration of transmit and receive circuits. The separate antenna may have a second antenna beam that is different from the first antenna beam. The second antenna beam may resemble or have certain characteristics of an omni-directional antenna beam or a quasi omni-directional antenna beam. The wireless device may have built-in self-test (BIST) capability and may also have better performance due to the separate antenna. The wireless device may be any electronics device supporting wireless communication.

Figure 1:
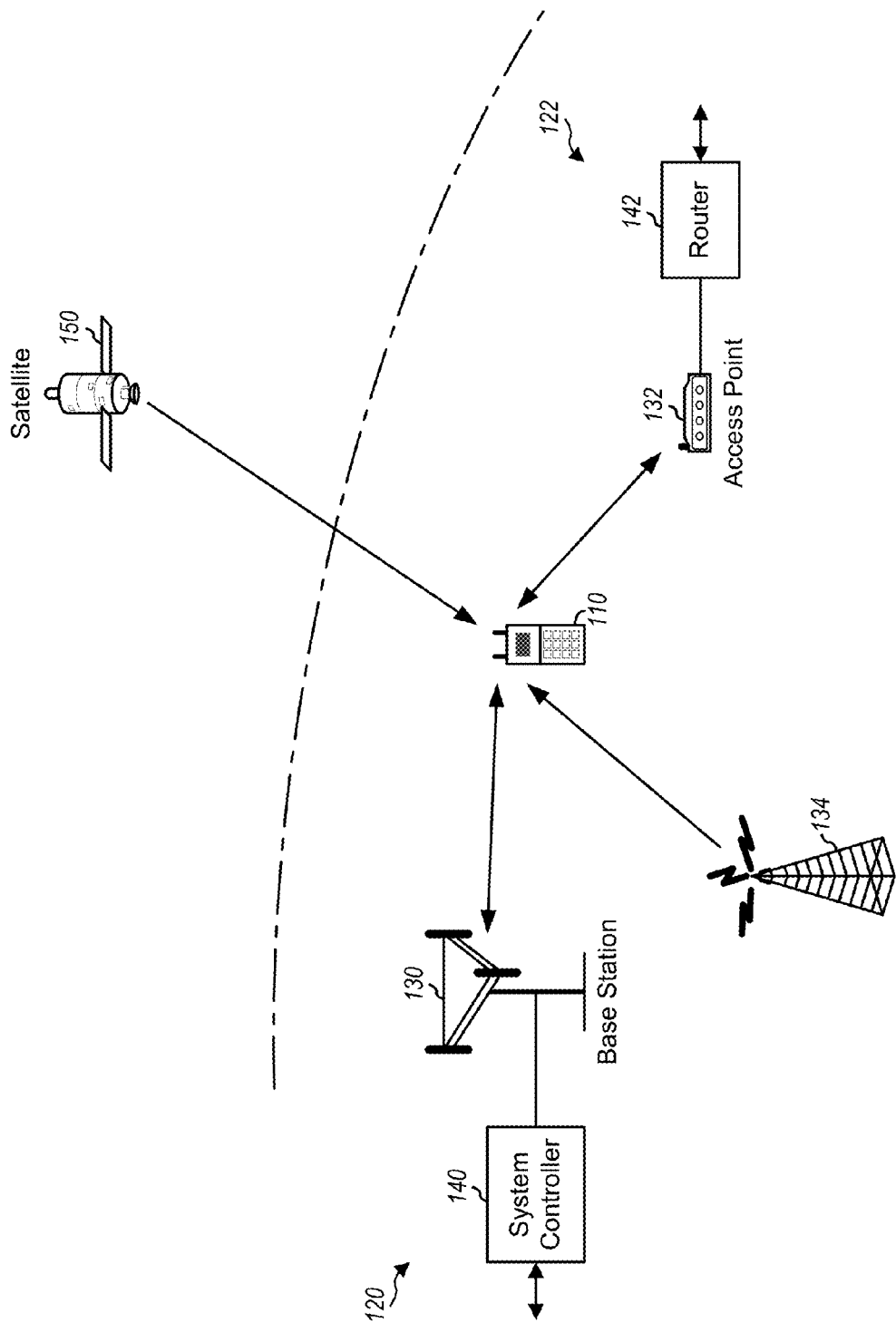
FIG. 1 shows a wireless device communicating with different wireless systems.

FIG. 1 shows a wireless device 110 capable of communicating with different wireless communication systems 120 and 122. Wireless system 120 may be a Long Term Evolution (LTE) system, a Code Division Multiple Access (CDMA) system, a Global System for Mobile Communications (GSM) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. Wireless system 122 may be a wireless local area network (WLAN) system, which may implement IEEE 802.11, Hiperlan, etc. For simplicity, FIG. 1 shows wireless system 120 including one base station 130 and one system controller 140, and wireless system 122 including one access point 132 and one router 142. In general, each wireless system may include any number of stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless system 120 and/or 122. Wireless device 110 may also receive signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1x, EVDO, TD-SCDMA, GSM, IEEE 802.11, etc.

Wireless device 110 may support operation at a very high frequency, e.g., within millimeter (mm)-wave frequencies from 40 to 300 gigahertz (GHz). For example, wireless device 110 may operate at 60 GHz for IEEE 802.11ad. Wireless device 110 may include an antenna system to support operation at mm-wave frequency. The antenna system may include a number of antenna elements, with each antenna element being used to transmit and/or receive signals. The terms "antenna" and "antenna element" may be used interchangeably. Each antenna element may be implemented with a patch antenna, a dipole antenna, or an antenna of some other type. A suitable antenna type may be selected for use based on the operating frequency of the wireless device, the desired performance, etc. In an exemplary design, an antenna system may include a number of patch antennas supporting operation at mm-wave frequency.

Figure 2:
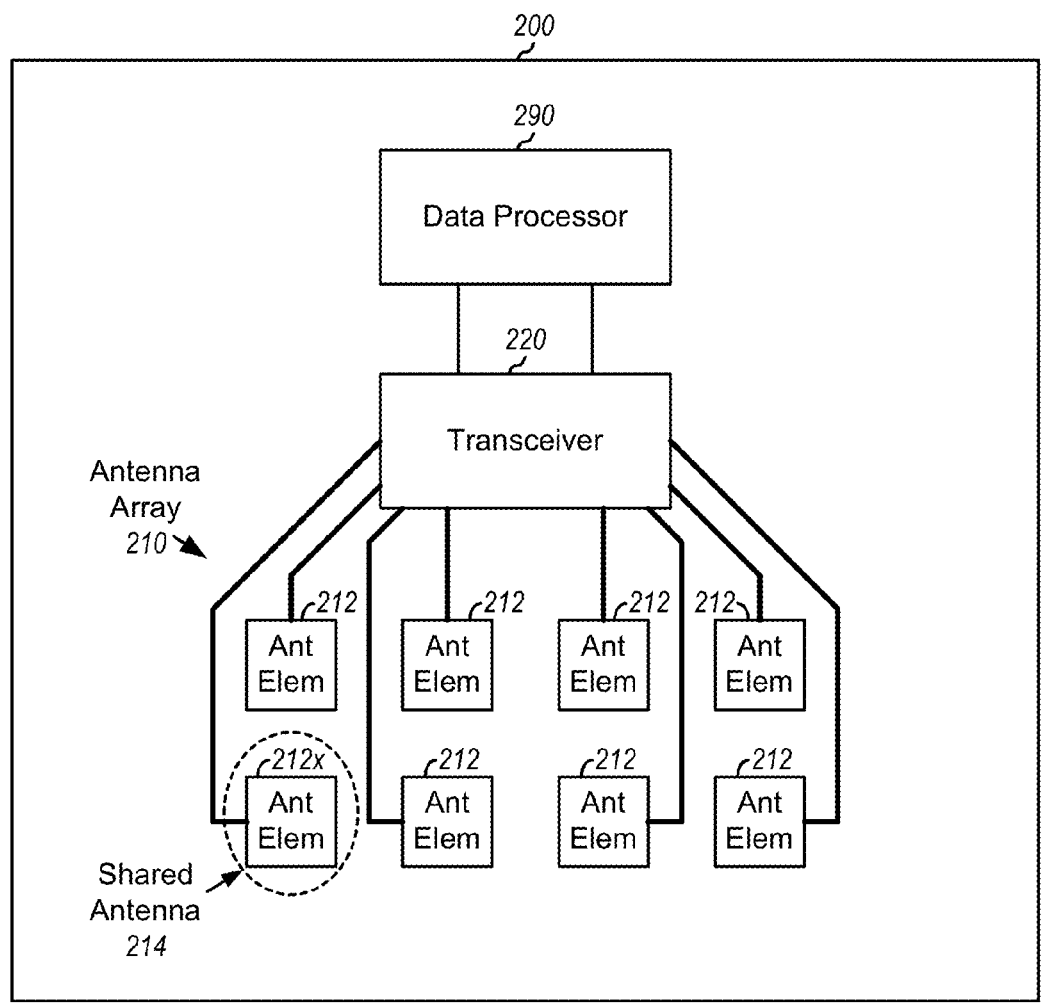
FIG. 2 shows a wireless device with an antenna array and a shared antenna.

FIG. 2 shows a block diagram of a wireless device 200 with an antenna array 210 and a shared antenna 214. Wireless device 200 further includes a transceiver 220 and a data processor 290.

FIG. 2 also shows a top view of an exemplary layout of antenna array 210. Antenna array 210 includes a number of antenna elements (Ant Elem) 212, which may be arranged in a 2×4 grid as shown in FIG. 2 or an M×N grid, where M and N may each be any integer value. Each antenna element 212 may be a patch antenna as shown in FIG. 2 or an antenna of some other type. One antenna element 212x within antenna array 210 is used to implement shared antenna 214.

Transceiver 220 is coupled to all antenna elements 212 of antenna array 210. Transceiver 220 includes transmit circuits to generate an output radio frequency (RF) signal for transmission via antenna elements 212. Transceiver 220 also includes receive circuits to condition and process an input RF signal obtained from antenna elements 212. Data processor 290 performs processing for data being transmitted via transceiver 220 and data being received via transceiver 220.

Figure 3:
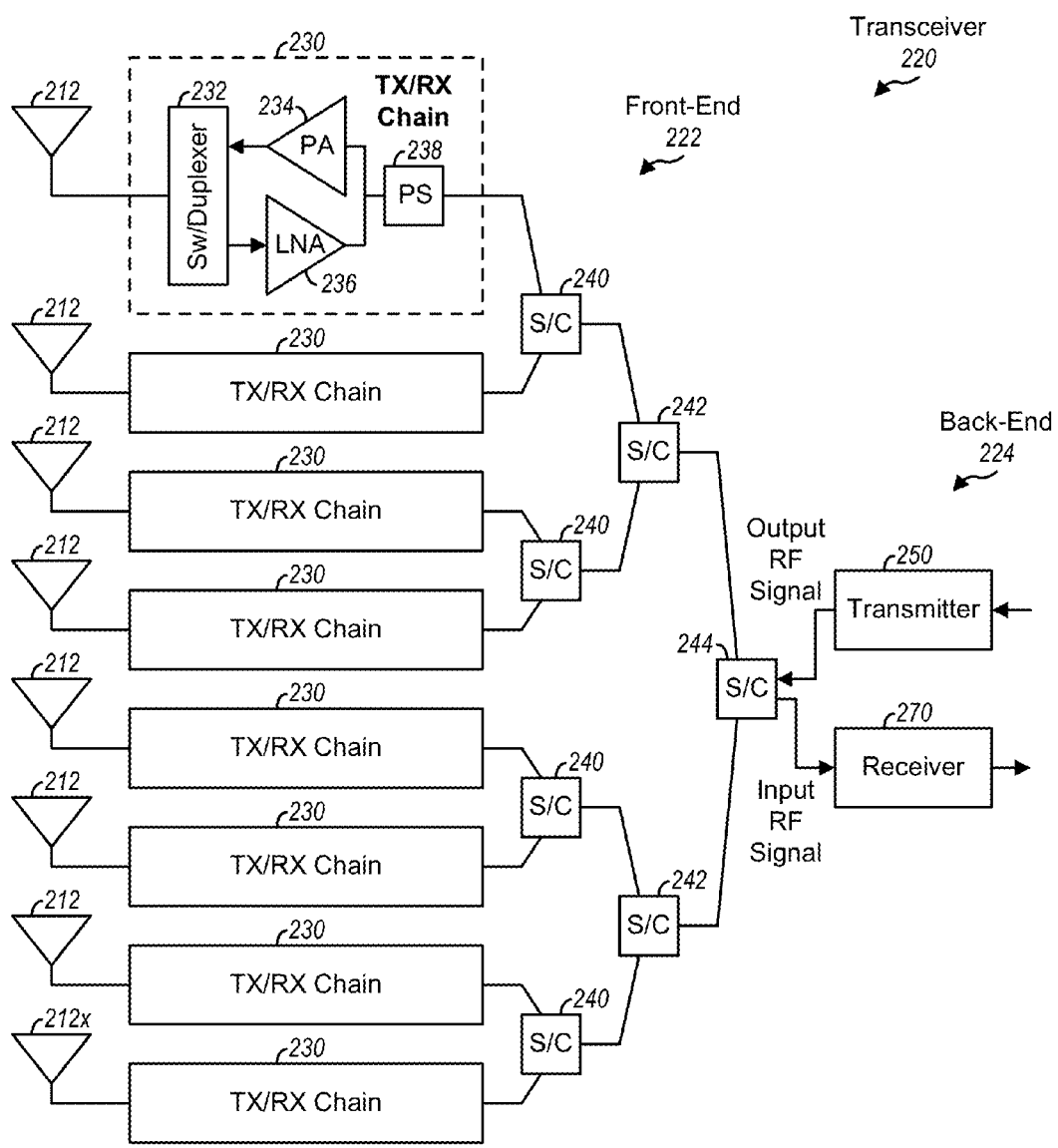
FIG. 3 shows a transceiver for the wireless device in FIG. 2.

FIG. 3 shows a schematic diagram of an exemplary design of transceiver 220 within wireless device 200 in FIG. 2. Transceiver 220 includes a front-end 222 and a back-end 224. Front-end 222 include a transmit/receive (TX/RX) chain 230 for each antenna element 212 and signal splitters/combiners (S/C) 240, 242 and 244. Back-end 224 includes a transmitter 250 and a receiver 270. Each TX/RX chain 230 is coupled to back-end 224 via a respective signal path, which includes signal splitters in the transmit direction and signal combiners in the receive direction.

In the exemplary design shown in FIG. 3, each TX/RX chain 230 includes a switch/duplexer (Sw/duplexer) 232, a power amplifier (PA) 234 in the transmit direction, a low noise amplifier (LNA) 236 in the receive direction, and a phase shifter (PS) 238, which are coupled as shown in FIG. 3. TX/RX chains 230 for antenna elements 212 are coupled to back-end 224 via splitters/combiners 240, 242 and 244. Each splitter/combiner 240, 242 and 244 may include a signal splitter in the transmit direction and a signal combiner in the receive direction. In the exemplary design shown in FIG. 3, each pair of TX/RX chains 230 is coupled to a respective splitter/combiner 240, each pair of splitters/combiners 240 is coupled to a respective splitter/combiner 242, and the two splitters/combiners 242 are coupled to splitter/combiner 244. Splitter/combiner 244 may include (i) a signal splitter that is coupled to transmitter 250 and (ii) a signal combiner that is coupled to receiver 270.

For data transmission, data processor 290 processes (e.g., encodes and modulates) data to be transmitted and provides output samples to transmitter 250. Within transmitter 250, the output samples are converted to analog signals, which are filtered, amplified, and upconverted to generate an output RF signal. The output RF signal is split by splitters 240, 242 and 244 to obtain an output RF signal for each TX/RX chain 230. Within each TX/RX chain 230, the output RF signal is phase shifted by phase shifter 238 by an amount selected for an associated antenna element 212. The phase-shifted output RF signal is amplified by PA 234 to generate a transmit RF signal, which is routed through switch/duplexer 232 and transmitted via the associated antenna element 212. Different phase shifts may be applied for different antenna elements 212 to obtain a desired antenna beam.

For data reception, antenna elements 212 receive signals from base stations and/or other stations, and each antenna element 212 provides a respective received RF signal to an associated TX/RX chain 230. Within each TX/RX chain 230, the received RF signal is routed through switch/duplexer 232, amplified by LNA 236, and phase shifted by phase shifter 238 by an amount selected for the associated antenna element 212. The phase-shifted received RF signals from all TX/RX chains 230 are combined by combiners 240, 242 and 244 to obtain an input RF signal, which is provided to receiver 270. Within receiver 270, the input RF signal is downconverted, amplified, filtered, and digitized to obtain input samples, which are provided to data processor 290.

Wireless device 200 in FIGS. 2 and 3 may utilize antenna array 210 for data transmission to other stations and possibly for data reception from other stations. Wireless device 200 may utilize shared antenna 214 for data reception from other stations and also for discovery to detect other stations and to allow other stations to detect wireless device 200.

Figure 4:
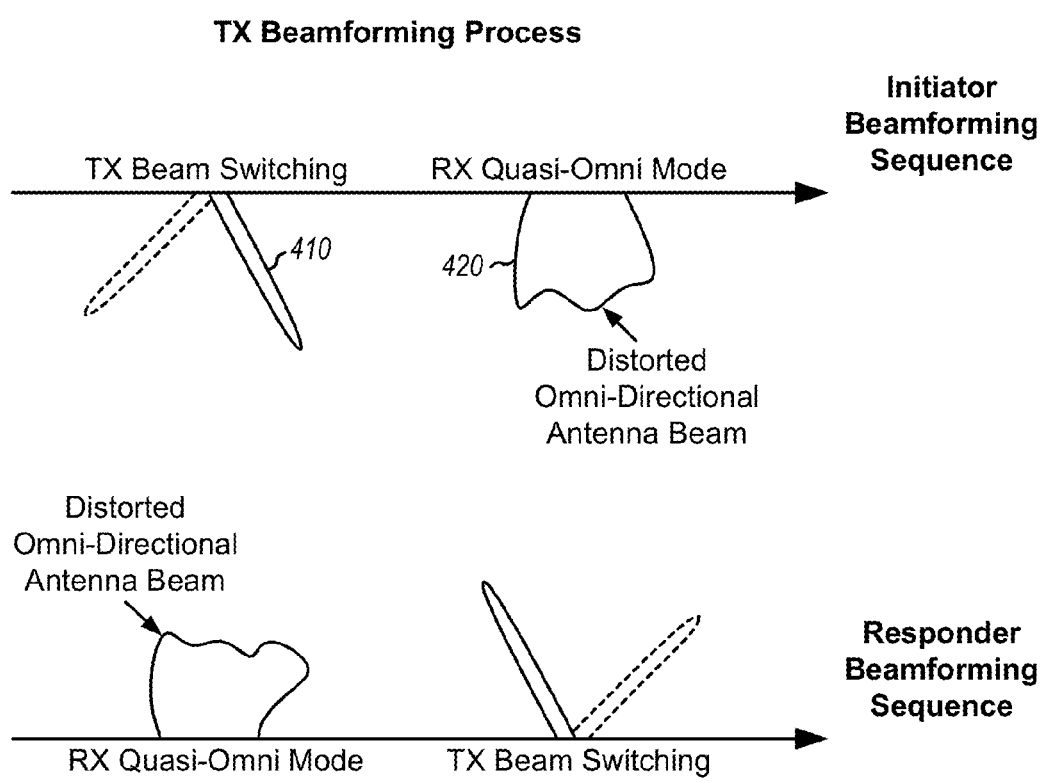
FIG. 4 shows a beamforming sequence for the wireless device in FIG. 2.

FIG. 4 shows a beamforming process for wireless device 200 in accordance with IEEE 802.11ad. Wireless device 200 may perform discovery (e.g., upon power up or periodically) to detect other stations with which wireless device 200 can communicate. Wireless device 200 may perform discovery with shared antenna 214 to receive signals in all directions from other stations. Wireless device 200 may communicate with another station using beamforming to improve performance. Wireless device 200 may perform spatial acquisition with the other station to determine the best transmit antenna beam to use. For spatial acquisition, the other station may transmit in different spatial directions with different transmit antenna beams. Wireless device 200 may receive the transmissions from the other station with shared antenna 214 and may detect which transmit antenna beam provides the best performance. The best transmit antenna beam may be selected for use.

As shown in FIG. 4, a transmit antenna beam 410 may be formed by antenna elements 212 of antenna array 210. Wireless device 200 may transmit in different spatial directions with beamforming by changing the phases of phase shifters 238 for antenna elements 212 of antenna array 210. Wireless device 200 may receive signals from different directions using one antenna element 212x in antenna array 210, which ideally should behave like an omni-directional antenna. A receive antenna beam 420 may be obtained with antenna element 212x. As shown in FIG. 4, receive antenna beam 420 may be distorted and may deviate greatly from an ideal omni-directional antenna beam due to coupling between antenna element 212x for shared antenna 214 and other antenna elements 212 of antenna array 210.

Wireless device 200 with shared antenna 214 may have some disadvantages. First, wireless device 200 may have inaccurate spatial acquisition due to a distorted receive antenna beam, which may deviate greatly from an ideal omni-directional antenna beam. Second, wireless device 200 may observe a higher noise level for reception using one antenna element 212x of antenna array 210. The received RF signal from antenna element 212x may be passed through splitters/combiners 240, 242 and 244, which introduce noise and result in a higher noise level for the received RF signal. The received RF signal would have a lower signal-to-noise ratio (SNR) going through splitters/combiners 240 to 244 as compared to a received RF signal that does not pass through splitters/combiners 240 to 244.

In an aspect of the present disclosure, a wireless device may include an antenna array and a separate antenna. The separate antenna may be located sufficiently far from antenna elements of the antenna array in order to reduce coupling between antenna elements and to reduce distortion of a receive antenna beam of the separate antenna.

In another aspect of the present disclosure, a separate TX/RX chain may be used for the separate antenna in order to support built-in self-test (BIST) of the wireless device. The separate antenna and its TX/RX chain may be used to test TX chains, RX chains, and/or other circuits on the wireless device.

Figure 5:
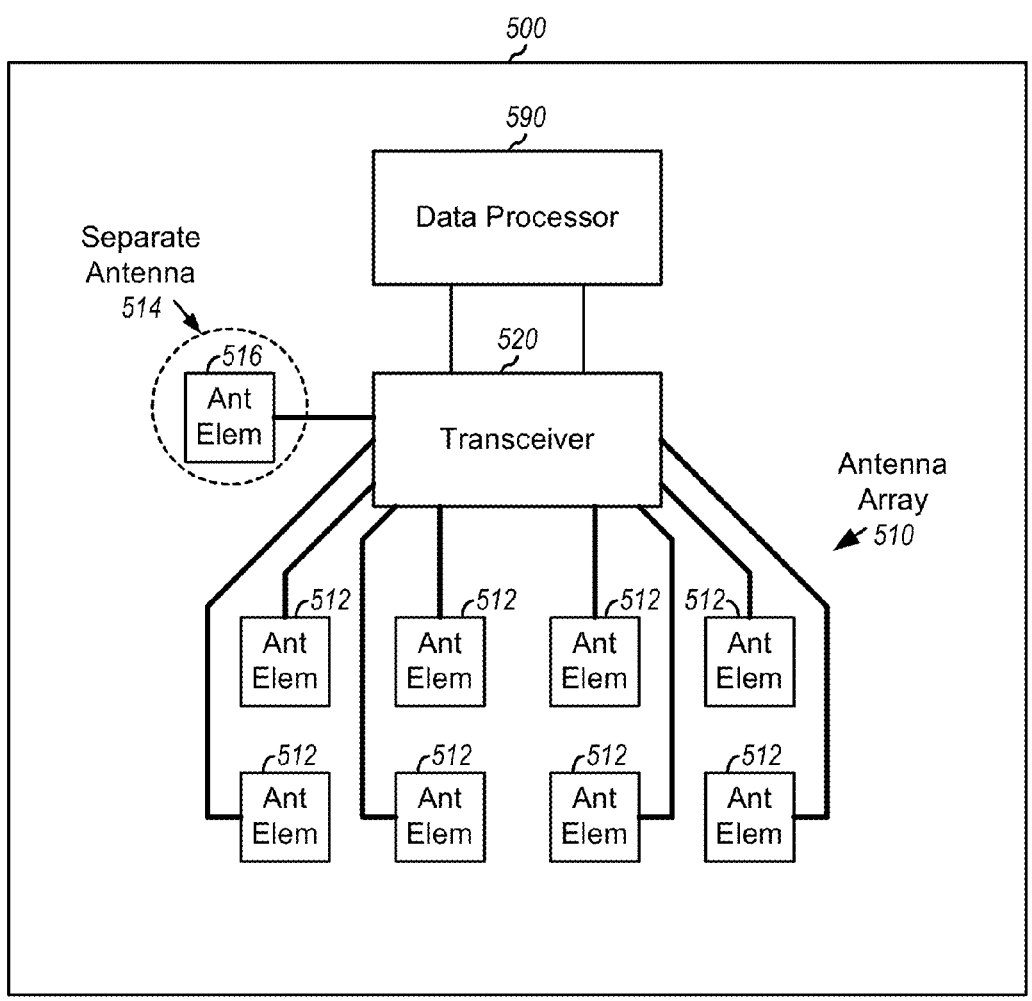
FIG. 5 shows a wireless device with an antenna array and a separate antenna.

FIG. 5 shows a block diagram of an exemplary design of a wireless device 500 with an antenna array 510 and a separate antenna 514. Wireless device 500 may be one exemplary design of wireless device 110 in FIG. 1. Wireless device 500 further includes a transceiver 520 and a data processor 590.

FIG. 5 also shows a top view of an exemplary layout of antenna array 510 and separate antenna 514. Antenna array 510 includes a number of antenna elements 512, which may be arranged in a 2×4 grid as shown in FIG. 5 or an M×N grid, where M and N may each be any integer value. Separate antenna 514 is implemented with one antenna element 516 that is separate from antenna elements 512 of antenna array 510. Antenna element 516 of separate antenna 514 may be located sufficiently far from antenna elements 512 of antenna array 510 in order to reduce coupling between these antenna elements and to reduce distortion of an antenna beam of separate antenna 514. Antenna element 516 may also be isolated from antenna elements 512 via one or more ground traces, guard rings, etc.

Antenna elements 512 and 516 may each be a patch antenna as shown in FIG. 5 or an antenna of some other type. A patch antenna may be implemented with a conductive patch or structure of any suitable size, which may be selected based on a target operating frequency (e.g., 60 GHz) of wireless device 500. A patch antenna may also be implemented with a conductive patch or structure of any suitable shape, which may be selected to obtain a desired antenna beam pattern.

In an exemplary design, antenna elements 512 and 516 may have similar size and shape. In this exemplary design, separate antenna 514 may have an antenna beam that resembles an antenna beam of one antenna element 512 of antenna array 510, without any coupling from remaining antenna elements 512 of antenna array 510. In another exemplary design, antenna element 516 may have a size and/or a shape that may be different from that of antenna elements 512. In this exemplary design, separate antenna 514 may have an antenna beam that is different from an antenna beam of one antenna element 512 of antenna array 510.

Transceiver 520 is coupled to all antenna elements 512 of antenna array 510 and to antenna element 516 of separate antenna 514. Transceiver 520 includes transmit circuits to generate an output RF signal for transmission via antenna elements 512 or 516. Transceiver 520 also includes receive circuits to condition and process an input RF signal obtained from antenna elements 512 or 516.

FIG. 5 shows an exemplary design of wireless device 500 with a single antenna array 510 and a single separate antenna 514. In general, wireless device 500 may include one or more antenna arrays and one or more separate antennas. Each separate antenna may be implemented with an antenna element that is separate from the antenna elements of the antenna array(s). Transceiver 520 may be coupled to all antenna elements of the antenna array(s) and all antenna elements of the separate antenna(s). Transceiver 520 may generate one or more output RF signals for the antenna elements and process one or more input RF signals from the antenna elements.

Figure 6A:
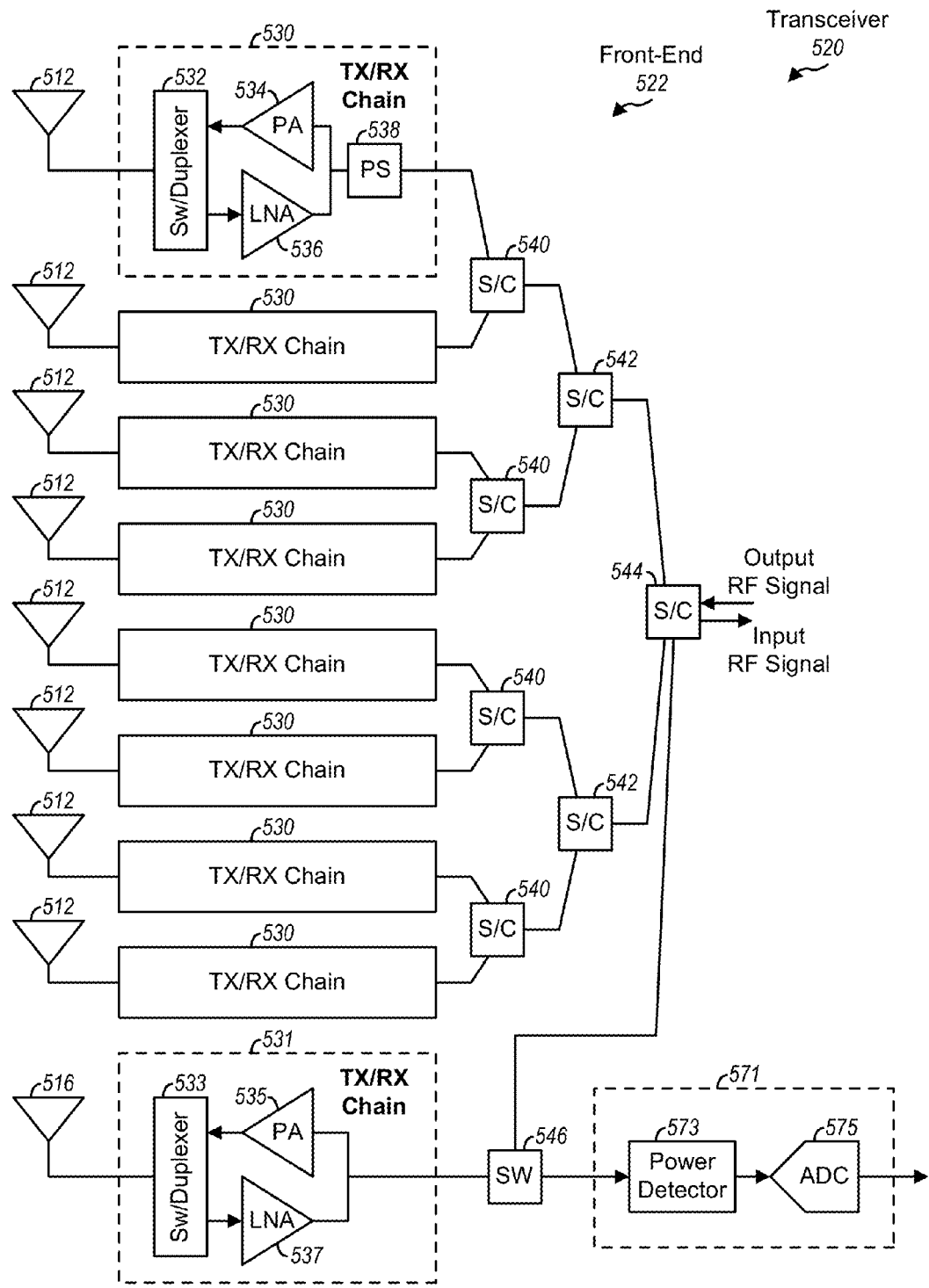
FIGS. 6A and 6B show a transceiver for the wireless device in FIG. 5.
Figure 6B:
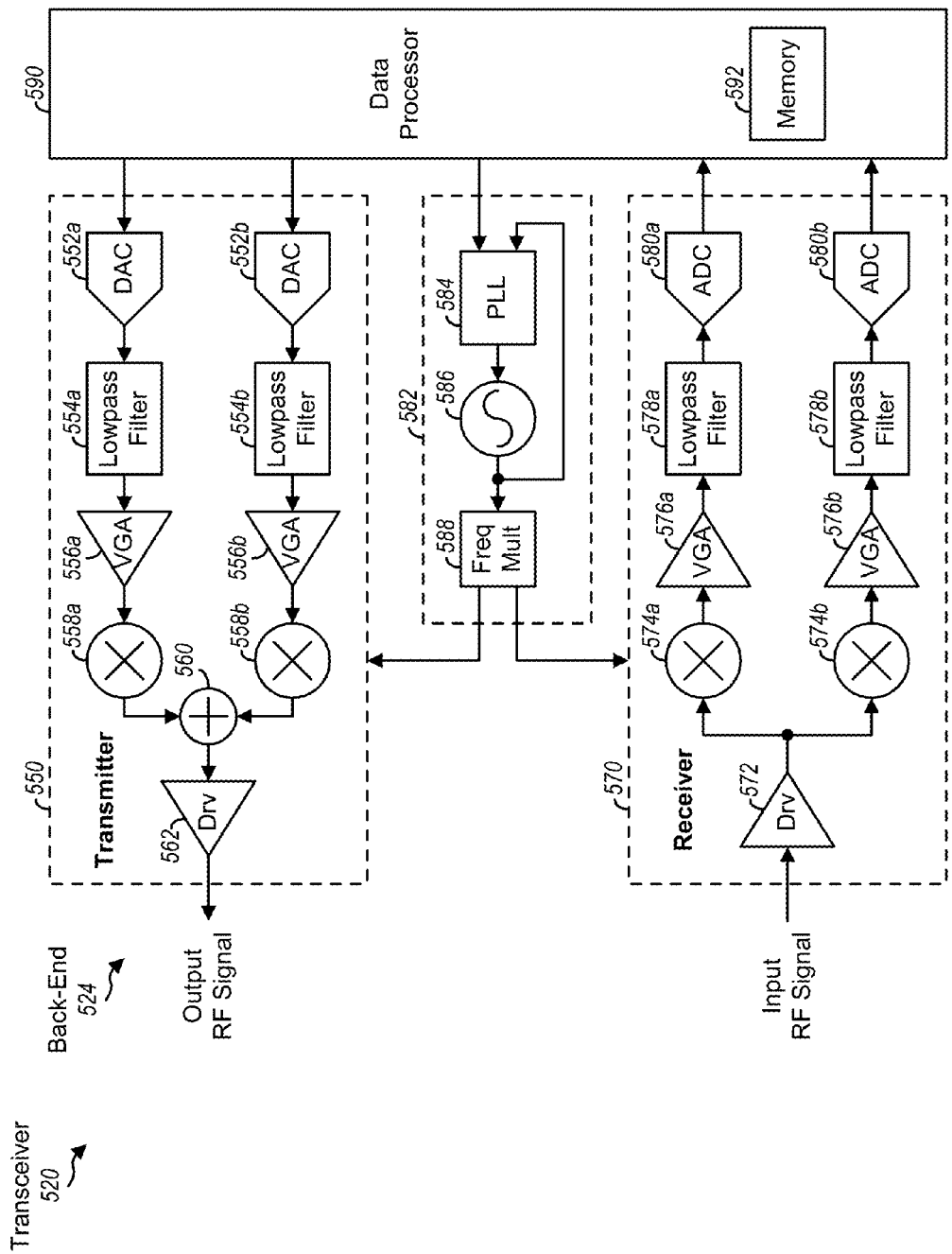

FIGS. 6A and 6B show a schematic diagram of an exemplary design of transceiver 520 within wireless device 500 in FIG. 5. Transceiver 520 includes a front-end 522 and a back-end 524.

In the exemplary design shown in FIG. 6A, front-end 522 includes a TX/RX chain 530 for each antenna element 512 of antenna array 510, a TX/RX chain 531 for antenna element 516 of separate antenna 514, splitters/combiners 540, 542 and 544, and a switch 546. TX/RX chains 530 and splitters/combiners 540, 542 and 544 for antenna array 510 are coupled in similar manner as TX/RX chains 230 and splitters/combiners 240, 242 and 244 for antenna array 210 in FIG. 3.

In the exemplary design shown in FIG. 6A, each TX/RX chain 530 includes a switch/duplexer 532, a PA 534, an LNA 536, and a phase shifter 538, which are coupled as shown in FIG. 6A. TX/RX chain 531 includes a switch/duplexer 533, a PA 535, and an LNA 537, which are coupled as shown in FIG. 6A. A phase shifter is not included in TX/RX chain 531 since separate antenna 514 comprises a single antenna element 516. TX/RX chain 530 and/or TX/RX chain 531 may include different and/or additional circuits not shown in FIG. 6A. In general, a TX/RX chain is a circuit block that includes (i) at least one circuit in the transmit direction and (ii) at least one circuit in the receive direction. The at least one circuit in the transmit direction may be part of a TX chain and may include a PA, a switch, a duplexer, a diplexer, a phase splitter, a signal splitter, etc. The at least one circuit in the receive direction may be part of an RX chain and may include an LNA, a switch, a duplexer, a diplexer, a phase splitter, a signal combiner, etc.

In the exemplary design shown in FIG. 6B, back-end 524 includes a transmitter 550, a receiver 570, and an LO generator 582. In the exemplary design shown in FIG. 6B, transmitter 550 includes (i) a digital-to-analog converter (DAC) 552a, a lowpass filter 554a, a variable gain amplifier (VGA) 556a, and a mixer 558a for an inphase (I) transmit path and (ii) a DAC 552b, a lowpass filter 554b, a VGA 556b, and a mixer 558b for a quadrature (Q) transmit path. Transmitter 550 further includes a summer 560 and a transmit driver (Drv) 562.

In the exemplary design shown in FIG. 6B, receiver 570 includes a receive driver 572. Receiver 570 further includes (i) a mixer 574a, a VGA 576a, a lowpass filter 578a, and an analog-to-digital converter (ADC) 580a for an I receive path and (ii) a mixer 574b, a VGA 576b, a lowpass filter 578b, and an ADC 580b for a Q receive path.

In the exemplary design shown in FIG. 6B, LO generator 582 includes a phase locked loop (PLL) 584, a voltage-controlled oscillator (VCO) 586, and a frequency multiplier (Freq Mult) 588. VCO 586 receives a control signal from PLL 584 and generates a VCO signal at a desired frequency determined by the control signal, which may be 15 GHz for IEEE 802.11ad or some other frequency. Frequency multiplier 588 multiplies the VCO signal in frequency (e.g., by a factor of 4) and provides an LO signal (e.g., at a frequency of 60 GHz for IEEE 802.11ad). PLL 584 receives a reference signal and the VCO signal from VCO 586, compares the phase of the VCO signal against the phase of the reference signal, and generates the control signal for VCO 586 such that the phase of the VCO signal is locked to the phase of the reference signal. LO generator 582 may also be implemented in other manners.

Back-end 524 further includes a test circuit 571, which is shown in FIG. 6A. In the exemplary design shown in FIG. 6A, test circuit 571 include a power detector 573 and an ADC 575. Switch 546 may couple TX/RX chain 531 to either power detector 573 or splitter/combiner 544. An input RF signal from LNA 537 may be routed through switch 546, detected by power detector 573, and digitized by ADC 575. Test circuit 571 may include different and/or additional circuits for making test measurements.

Referring back to FIG. 6B, for data transmission, data processor 590 processes (e.g., encodes and modulates) data to be transmitted and provides I and Q output samples to transmitter 550. Within transmitter 550, the I and Q output samples are converted to analog signals by DACs 552a and 552b, filtered by lowpass filters 554a and 554b, amplified by VGAs 556a and 556b, and upconverted by mixers 558a and 558b. The I and Q upconverted signals from mixers 558a and 558b are summed by summer 560 and amplified by transmit driver 562 to generate an output RF signal. Referring to FIG. 6A, the output RF signal is split by splitters 540, 542 and 544 to obtain an output RF signal for each TX/RX chain 530. Within each TX/RX chain 530, the output RF signal is phase shifted by phase shifter 538 by an amount selected for an associated antenna element 512. The phase-shifted output RF signal is amplified by PA 534 to generate a transmit RF signal, which is routed through switch/duplexer 532 and transmitted via the associated antenna element 512. Different phase shifts may be applied for different antenna elements 512 to obtain a desired antenna beam.

For data reception, antenna elements 512 receive signals from base stations and/or other stations, and each antenna element 512 provides a respective received RF signal to an associated TX/RX chain 530. Within each TX/RX chain 530, the received RF signal is routed through switch/duplexer 532, amplified by LNA 536, and phase shifted by phase shifter 538 by an amount selected for the associated antenna element 512. The phase-shifted received RF signals from all TX/RX chains 530 are combined by combiners 540, 542 and 544 to obtain an input RF signal, which is provided to receiver 570. Referring to FIG. 6B, within receiver 570, the input RF signal is amplified by receive driver 572, downconverted by mixers 574a and 574b, amplified by VGAs 576a and 576b, filtered by lowpass filters 578a and 578b, and digitized by ADCs 580a and 580b to obtain I and Q input samples, which are provided to data processor 590.

FIGS. 6A and 6B show an exemplary design of transceiver 520, transmitter 550, and receiver 570. Transceiver 520 may include additional, fewer, or different circuits. For example, transceiver 520 may include switches, duplexers, diplexers, transmit filters, receive filters, matching circuits, an oscillator, etc. Transmitter 550 and receiver 570 may each include additional, fewer, or different circuits. The circuits in transmitter 550 and/or receiver 570 may also be arranged differently than the arrangement shown in FIGS. 6A and 6B. For example, DACs 552 and ADCs 580 may be part of transceiver 520 (as shown in FIG. 6B) or may be part of digital processor 590. All or a portion of transceiver 520 may be implemented on one or more analog integrated circuits (ICs), RF ICs (RFICs), mixed-signal ICs, etc.

Referring to FIG. 6B, data processor 590 may perform various functions for wireless device 110. For example, data processor 590 may perform processing for data being transmitted via transceiver 520 and data being received via transceiver 520. Data processor 590 may also control the operation of various circuits within transceiver 520. Data processor 590 includes a memory 592 to store program codes and data for data processor 590. Data processor 590 may be implemented on one or more application specific integrated circuits (ASICs) and/or other ICs.

Wireless device 500 may utilize antenna array 510 for data transmission and/or data reception. Wireless device 500 may utilize separate antenna 514 for data transmission and/or data reception and also for discovery to detect other stations and to allow other stations to detect wireless device 500.

Figure 7:
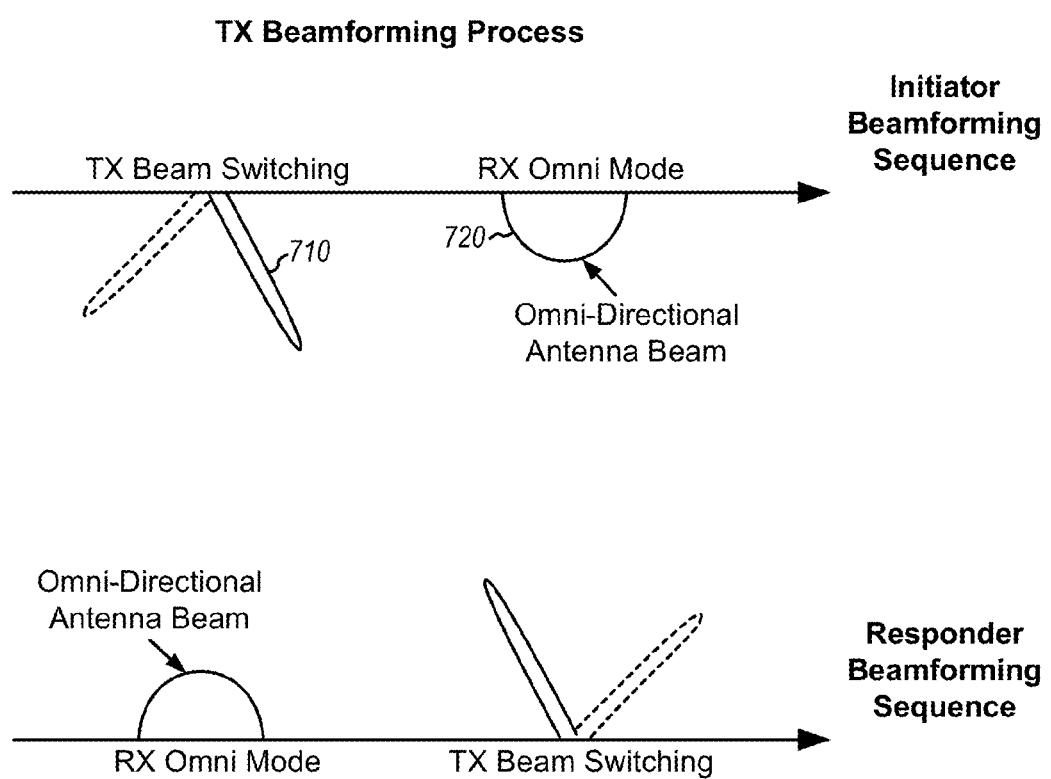
FIG. 7 shows a beamforming sequence for the wireless device in FIG. 5.

FIG. 7 shows a beamforming process for wireless device 500 in accordance with IEEE 802.11ad. A transmit antenna beam 710 may be formed by antenna elements 512 of antenna array 510. Wireless device 500 may transmit in different spatial directions with beamforming by changing the phases of phase shifters 538 for antenna elements 512 in antenna array 510. Beamforming may improve antenna gain and increase throughput of wireless device 500. Transmit antenna beam 710 may be dependent on the number of antenna elements 512 and their layout/arrangement, the size and shape of each antenna element 512, the phases of the transmit RF signals sent from antenna elements 512, etc. Wireless device 500 may receive signals from different directions with antenna element 516 of separate antenna 514. A receive antenna beam 720 may be formed by antenna element 516. Receive antenna beam 720 may be dependent on the size and shape of antenna element 516, the coupling between antenna element 516 of separate antenna 514 and antenna elements 512 of antenna array 510, etc. Receive antenna beam 720 may resemble an antenna beam of one antenna element 512 of antenna array with no coupling from other antenna elements 512 of antenna array 510. As shown in FIG. 7, receive antenna beam 720 of separate antenna 514 may resemble or have certain characteristics an omni-directional antenna beam pattern due to less coupling between antenna element 516 of separate antenna 514 and antenna elements 512 of antenna array 510. For example, separate antenna 514 may have a wider angle of coverage and/or less gain variation across the coverage angle due to less coupling between antenna elements.

The exemplary design of wireless device 500 shown in FIGS. 5 to 6B may have various advantages. First, better gain flatness may be achieved for separate antenna 514 by separating antenna element 516 from antenna elements 512 of antenna array 510. This may improve the accuracy of spatial acquisition to determine the best transmit antenna beam. Second, a lower noise level and a higher SNR may be achieved for a received RF signal from separate antenna 514 due to the use of a separate TX/RX chain 531 for separate antenna 514. TX/RX chain 531 is coupled to splitter/combiner 544 and bypasses splitters/combiners 540 and 542. This may result in the received RF signal from separate antenna 514 observing less noise and achieving a higher SNR than a received RF signal from antenna element 212x in FIGS. 2 and 3.

In yet another aspect of the present disclosure, self-testing may be performed using separate antenna 514 and its TX/RX chain to test or calibrate TX/RX chains for antenna array 510 on wireless device 500. The self-testing may be used for production testing and/or field testing of wireless device 500.

Wireless device 500 in FIGS. 5 to 6B may support a transmit mode, a receive mode, and a test mode. The transmit mode and the receive mode may be considered as two configurations of an operational mode. In the transmit mode, an output RF signal may be generated and transmitted via antenna array 510. In the receive mode, an input RF signal may be obtained via antenna array 510 or separate antenna 514 and may be processed to recover data sent to wireless device 500. In the test mode, TX chains and/or RX chains for antenna elements 512 may be tested using separate antenna 514. The test mode may be used for self-test of antenna elements and transceiver circuitry using loop-back via over-the-air transmission of a test signal.

Figure 8:
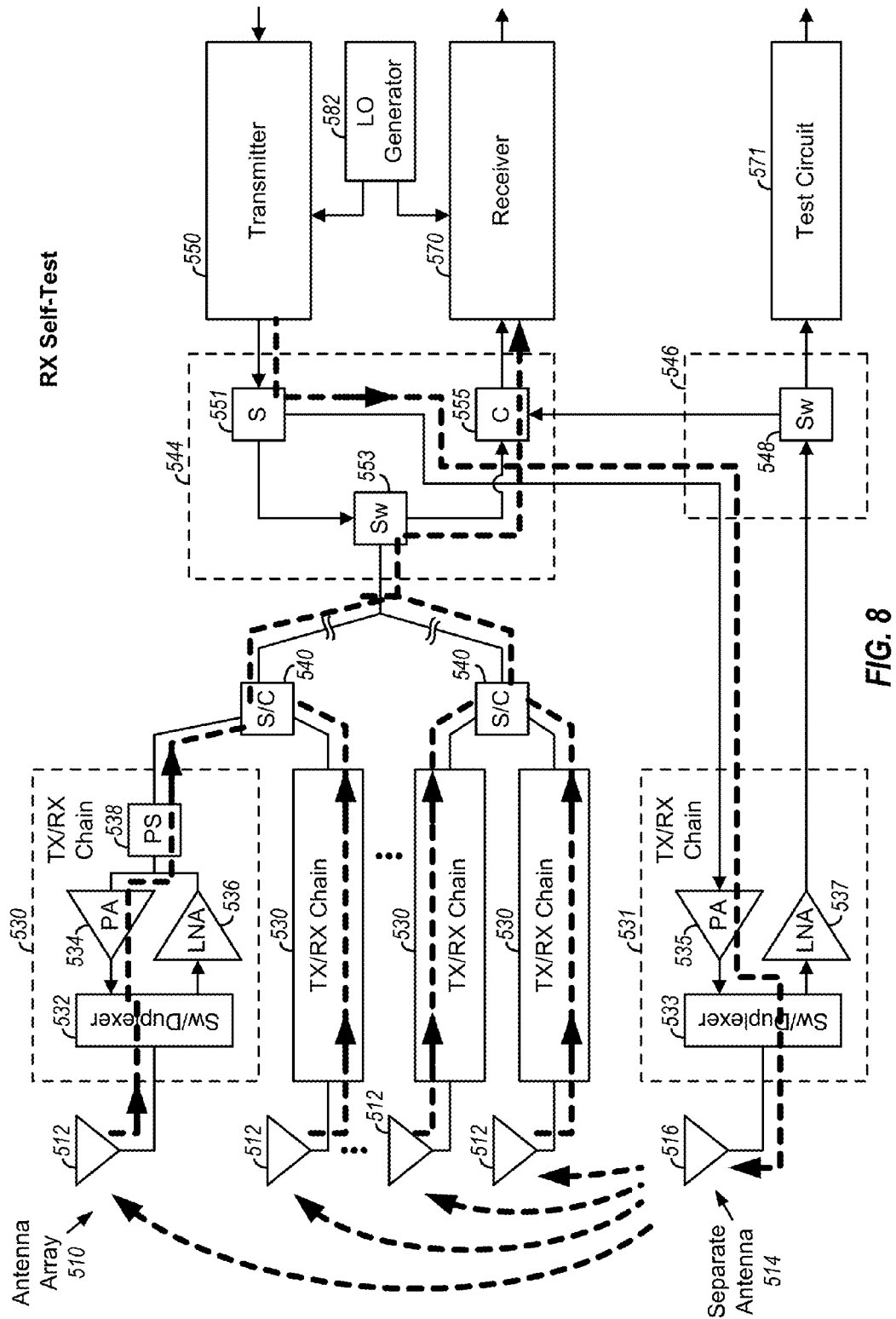
FIGS. 8 and 9 show self-test of receive (RX) chains and transmit (TX) chains, respectively, for the antenna array using the separate antenna on the wireless device in FIG. 5.

FIG. 8 shows an exemplary design of performing self-test of RX chains for antenna elements 512 of antenna array 510 using separate antenna 514. For RX self-test, a test signal may be generated by transmitter 550, amplified by TX chain 531, transmitted via separate antenna 514, received by antenna array 510, amplified by RX chains 530, combined by combiners 540 to 544, and processed by receiver 570.

In the exemplary design shown in FIG. 8, splitter/combiner 544 includes a signal splitter (S) 551, a switch (Sw) 553, and a signal combiner (C) 555. Signal splitter 551 has an input coupled to an output of transmitter 550, a first output coupled to switch 553, and a second output coupled to PA 535 within TX/RX chain 531. Switch 553 has its single pole coupled to splitters/combiners 542 (not shown in FIG. 8), its first throw coupled to the first output of splitter 551, and its second throw coupled to a first input of combiner 555. Combiner 555 has its second input coupled to switch 546 and its output coupled to receiver 570. Switch 546 includes a switch 548 having its single pole coupled to LNA 537, its first throw coupled to the second input of combiner 555, and its second throw coupled to test circuit 571.

Transmitter 550 may generate a test signal at a target frequency. The test signal may be a tone signal at the target frequency, which may be 60 GHz for IEEE 802.11ad or some other frequency. The test signal may also be an amplitude modulated (AM) signal centered at the target frequency. The test signal may be routed through signal splitter 551, amplified by PA 535 within TX/RX chain 531, routed through switch/duplexer 533, and transmitted via antenna element 516 of separate antenna 514.

Antenna elements 512 of antenna array 510 may receive the test signal transmitted from antenna element 516 and may provide received RF signals to RX chains 530. The received RF signal from each antenna element 512 may be conditioned and processed by RX chain 530 for that antenna element 512. In particular, for each antenna element 512, the received RF signal may be routed through switch/duplexer 532, amplified by LNA 536, and phase shifted by phase shifter 538. The phase-shifted RF signals from all RX chains may be combined by splitter/combiner 540 and 542, routed through switch 553, passed through combiner 555, and provided as an input RF signal to receiver 570. The input RF signal may be processed by receiver 570 to obtain samples, which may be provided to data processor 590 for further processing.

Figure 9:
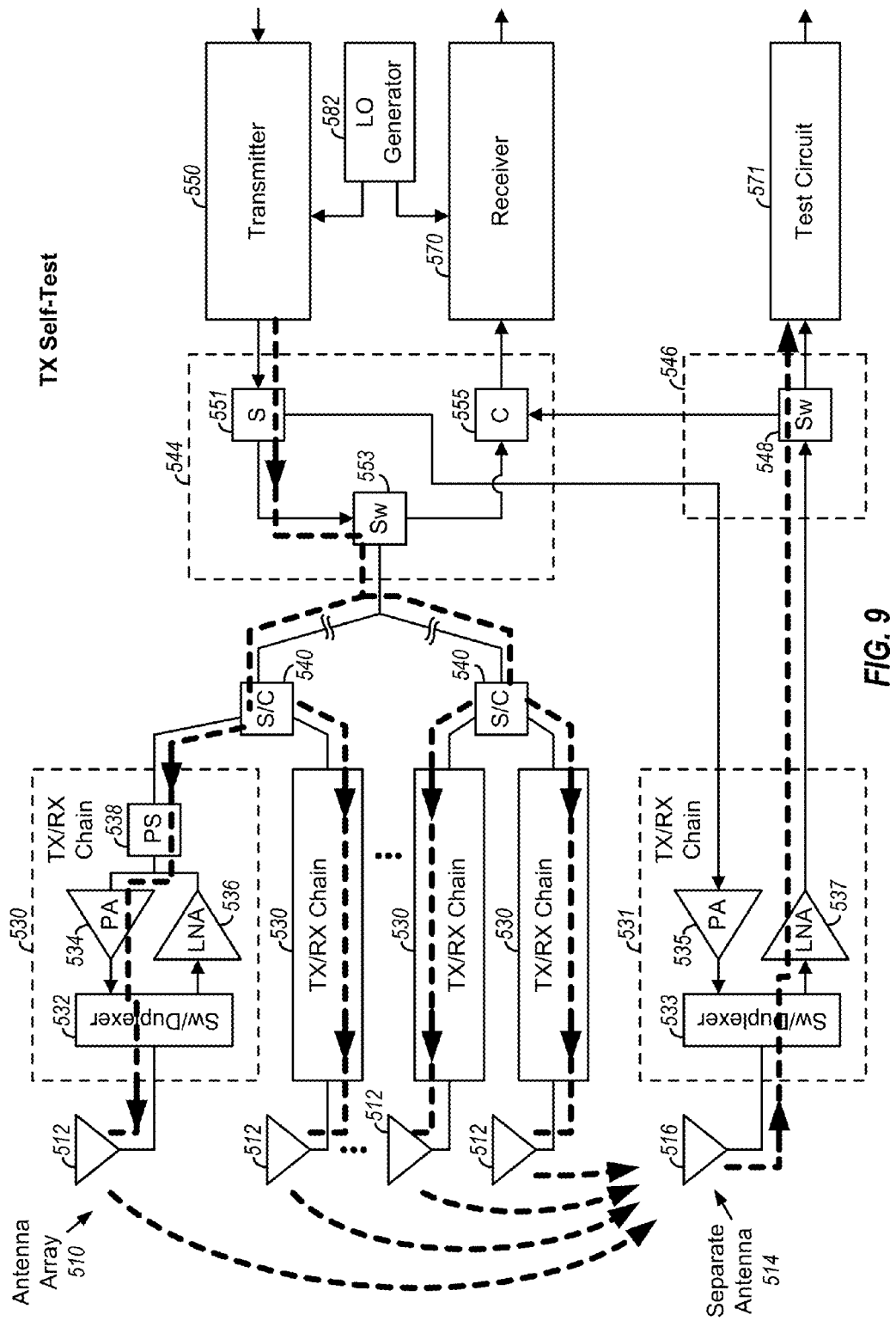

FIG. 9 shows an exemplary design of performing self-test of TX chains for antenna elements 512 of antenna array 510 using separate antenna 514. For TX self-test, a test signal may be generated by transmitter 550, amplified by TX chains 530, transmitted via antenna array 510, received by separate antenna 514, amplified by RX chain 531, and processed by receiver 570 and/or test circuit 571.

Transmitter 550 may generate a test signal at a target frequency. The test signal may be a tone signal, an AM signal, etc. The test signal may be routed through signal splitter 551 and switch 553 within splitter/combiner 544, routed through splitters/combiners 540 and 542, amplified by PA 534 within TX/RX chain 530, routed through switch/duplexer 532, and transmitted via antenna elements 512 of antenna array 510.

Antenna element 516 of separate antenna 514 may receive the test signal transmitted from antenna elements 512 and may provide a received RF signal to RX chain 531. The received RF signal may be routed through switch/duplexer 533 and amplified by LNA 537 within RX chain 531. The amplified RF signal from LNA 537 may be routed through switch 548 and provided to test circuit 571, as shown in FIG. 9. Alternatively or additionally, the amplified RF signal from LNA 537 may be routed through switch 548, passed through combiner 555, and provided as an input RF signal to receiver 570.

Figure 10:
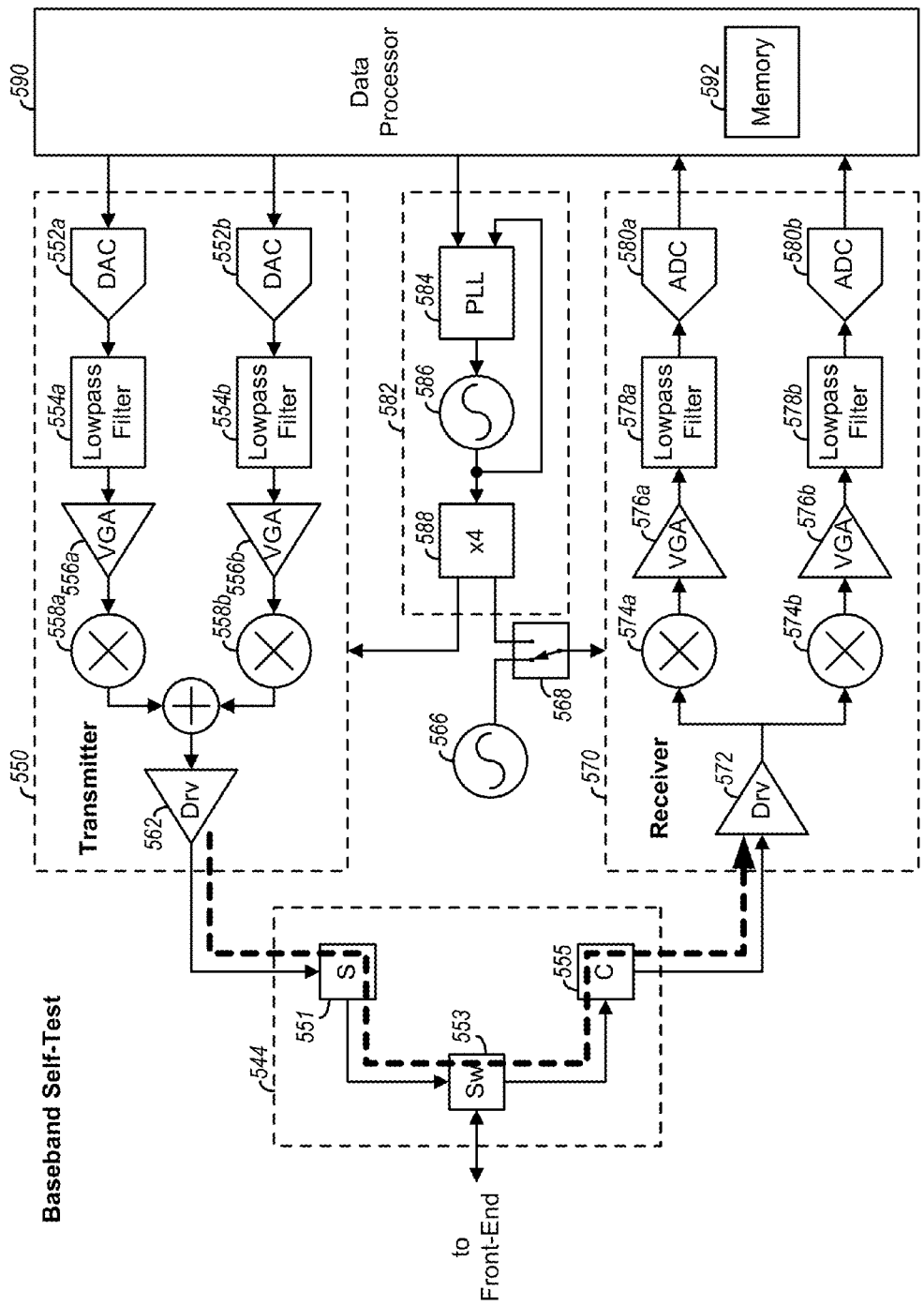
FIG. 10 shows self-test for baseband calibration.

FIG. 10 shows an exemplary design of performing self-test for baseband calibration. For baseband calibration, a test signal may be generated by transmitter 550 and looped back to receiver 570. Transmitter 550 may generate a test signal at a target frequency. The test signal may be a tone signal, an AM signal, etc. The test signal may be routed through signal splitter 551, switch 553, and combiner 555 within splitter/combiner 544 and provided as an input RF signal to receiver 570. Receiver 570 may process the input RF signal and provide I and Q input samples to data processor 590.

In the exemplary design shown in FIG. 10, LO generator 582 may generate a first LO signal used by transmitter 550 to generate the test signal. An oscillator 566 may generate a second LO signal, which may be routed through a switch 568 and provided to receiver 570 for use to downconvert the test signal. The frequency of the first LO signal may be different from the frequency of the second LO signal for calibrating I/Q imbalance in transmitter 550 and receiver 570.

The test mode with loop-back testing (e.g., as shown in FIGS. 8 to 10) may be used to test or calibrate wireless device 500 during production and/or field operation. This may improve manufacturing efficiency (e.g., reduce production test time) since a relatively long time may be required for production testing of wireless device 500. The loop-back testing may also avoid the need to test wireless device 500 against a "golden unit". This may avoid the need to maintain the golden unit for testing purposes and may also avoid having to accurately position wireless device 500 against the golden unit for testing. The loop-back testing may also avoid the need for an external control system to control and coordinate operation of the golden unit and wireless device 500 and to evaluate failure/success.

In an exemplary design, an apparatus (e.g., a wireless device, an IC, a circuit module, a circuit board, etc.) may comprise an antenna array and a separate antenna. The antenna array (e.g., antenna array 510 in FIG. 5) may comprise a plurality of antenna elements (e.g., antenna elements 512) having a first antenna beam. The separate antenna (e.g., separate antenna 514) may comprise an antenna element (e.g., antenna element 516) having a second antenna beam, which may be different from the first antenna beam. The second antenna beam may be determined based on the design of the antenna element of the separate antenna. The antenna element may be separate from the plurality of antenna elements of the antenna array. The antenna array and the separate antenna may be active at different times in an operational mode. The plurality of antenna elements of the antenna array may be arranged in a grid of M rows and N columns, where M and N may each be one or greater. The antenna element of the separate antenna may be separate from the grid.

The first antenna beam for the antenna array may be obtained with beamforming. In an exemplary design, the antenna element of the separate antenna may have similar size and shape as each antenna element of the antenna array.

In this exemplary design, the second antenna beam for the separate antenna may correspond to (or resemble) an antenna beam of one antenna element of the antenna array without any coupling from the remaining antenna elements of the antenna array. In an exemplary design, the second antenna beam for the antenna element of the separate antenna may be an omni-directional antenna beam or a quasi omni-directional antenna beam. A quasi omni-directional antenna beam is an antenna beam having (i) a certain minimum angle of coverage (e.g., 120 degrees or some other angle) and (ii) antenna gain variation of less than a certain limit (e.g., 3 decibels) across the coverage angle.

In an exemplary design, the plurality of antenna elements of the antenna array may be coupled to a receiver via at least one signal splitter/combiner (e.g., splitters/combiners 540, 542 and 544 in FIG. 6A). The antenna element of the separate antenna may be coupled to the receiver without going through (or bypassing) the at least one signal splitter/combiner. This may mitigate degradation in SNR due to noise introduced by the at least one signal splitter/combiner.

The operating mode may include a transmit configuration/mode and a receive configuration/mode. In an exemplary design, the antenna array may transmit and the separate antenna may be inactive in the transmit configuration. The separate antenna may receive and the antenna array may be inactive in the receive configuration. The antenna array may receive and the separate antenna may transmit in a test mode, e.g., as shown in FIG. 8. In this case, the separate antenna may transmit a test signal and the antenna array may receive the test signal. Alternatively, the antenna array may transmit and the separate antenna may receive in the test mode, e.g., as shown in FIG. 9. In this case, the antenna array may transmit a test signal and the separate antenna may receive the test signal.

In another exemplary design, an apparatus (e.g., a wireless device, an IC, a circuit module, a circuit board, etc.) may comprise a first TX/RX chain and at least one TX/RX chain. The first TX/RX chain (e.g., TX/RX chain 531 in FIG. 6A) may be coupled to a first antenna element (e.g., antenna element 516) on a wireless device. The first TX/RX chain may be disabled in an operational mode and enabled in a test mode of the wireless device. The at least one TX/RX chain (e.g., TX/RX chains 530) may be coupled to at least one antenna element (e.g., antenna elements 512) on the wireless device. The at least one TX/RX chain may be enabled in the operational mode. The first antenna element may be separate from the at least one antenna element. In an exemplary design, the first antenna element may have a first antenna beam, which may be determined based on the design (e.g., the size and shape) of the first antenna element. The at least one antenna element may comprise an array of antenna elements having a second antenna beam, which may be obtained with beamforming.

In an exemplary design, the first TX/RX chain may include a PA and an LNA. The PA (e.g., PA 535) may receive an output RF signal and provide a transmit RF signal to the first antenna element. The LNA may receive a received RF signal from the first antenna element and provide an input RF signal.

For RX self-test in the test mode, the first TX/RX chain may provide a test signal for transmission via the first antenna element. The at least one TX/RX chain may receive the test signal via the at least one antenna element. For TX self-test in the test mode, the at least one TX/RX chain may condition a test signal for transmission via the at least one antenna element. The first TX/RX chain may receive the test signal via the first antenna element.

Figure 11:
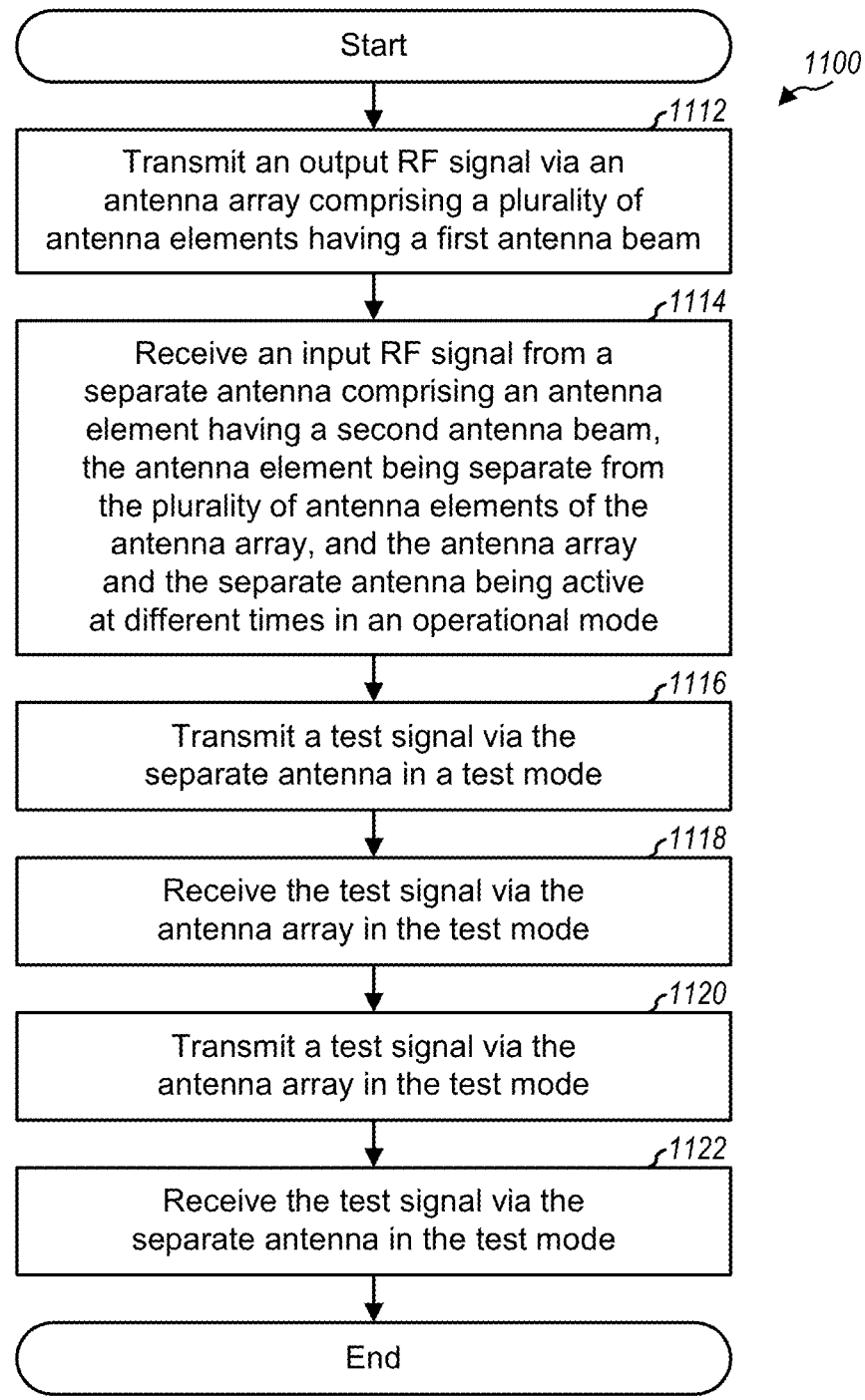
FIG. 11 shows a process for transmitting and receiving signals.

FIG. 11 shows an exemplary design of a process 1100 for transmitting and receiving signals. An output RF signal may be transmitted via an antenna array comprising a plurality of antenna elements having a first antenna beam (block 1112). An input RF signal may be received from a separate antenna comprising an antenna element having a second antenna beam, which may be different from the first antenna beam (block 1114). The antenna element may be separate from the plurality of antenna elements of the antenna array. The antenna array and the separate antenna may be active at different times in an operational mode.

For RX self-test in a test mode, a test signal may be transmitted via the separate antenna (block 1116) and may be received via the antenna array (block 1118). For TX self-test in the test mode, a test signal may be transmitted via the antenna array (block 1120) and may be received via the separate antenna (block 1122).

The antennas and circuits described herein may each be implemented on an IC, an analog IC, an RFIC, a mixed-signal IC, an ASIC, a circuit board, a printed circuit board (PCB), an electronic device, etc. The antennas and circuits may each be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the antennas and/or circuits described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
an antenna array comprising a plurality of beamforming antenna elements;
a first antenna comprising an omni-directional or quasi omni-directional antenna element, the omni-directional or quasi omni-directional antenna element being separate from the plurality of beamforming antenna elements of the antenna array and located outside a grid containing the plurality of beamforming antenna elements, the antenna array and the first antenna configured to operate at either different times or concurrently based on an operational mode of the apparatus, the operational mode selected from a group consisting of a transmit mode, a receive mode, a first test mode, and a second test mode;
a splitter/combiner coupled to the antenna array via a plurality of beamforming transmit/receive (TX/RX) chains;
a transmitter coupled to the splitter/combiner, the transmitter configured to generate an output radio frequency (RF) signal, wherein the output RF signal is transmitted through the first antenna in the first test mode and the output RF signal is transmitted through the antenna array in the second test mode;
a receiver coupled to the splitter/combiner, the receiver configured to obtain input samples from an input RF signal, wherein the input RF signal is received through the antenna array in the first test mode and the input RF signal is received through the first antenna in the second test mode;
a test circuit configured to make test measurements during the second test mode; and
a switch configured to selectively couple the first antenna either to the splitter/combiner or to the test circuit based on the operational mode via a first TX/RX chain, the first TX/RX chain separate from the plurality of beamforming TX/RX chains.

2. The apparatus of claim 1, wherein the first test mode comprises a receive test mode and the second test mode comprises a transmit test mode.

3. The apparatus of claim 2, wherein during the receive test mode:
the transmitter configured to generate a test signal;
the first antenna configured to transmit the test signal;
the antenna array configured to receive the test signal; and
the receiver configured to process the test signal.

4. The apparatus of claim 2, wherein during the transmit test mode:
the transmitter configured to generate a test signal;
the antenna array configured to transmit the test signal;
the first antenna configured to receive the test signal; and
the test circuit configured to process the test signal.

5. The apparatus of claim 1, the antenna array configured to transmit during the second test mode and the first antenna configured to receive during the second test mode.

6. The apparatus of claim 1, the first antenna configured to transmit during the first test mode and the antenna array configured to receive during the first test mode.

7. The apparatus of claim 1, the first TX/RX chain comprising:
a power amplifier (PA) configured to receive an output RF signal and to provide a transmit RF signal to the first antenna; and
a low noise amplifier (LNA) configured to receive a received RF signal from the first antenna and to provide an input RF signal to the splitter/combiner.

8. The apparatus of claim 1, the apparatus including a front-end portion of a transceiver, the transceiver included in a first wireless device, the first antenna and the antenna array are further configured to operate concurrently during the first test mode or the second test mode, and the first antenna is further configured to transmit information to a wireless device during the transmit mode.

9. The apparatus of claim 1, wherein the test circuit comprises:
a power detector configured to receive the input RF signal from the first TX/RX chain; and
an analog-to-digital converter (ADC) configured to perform analog-to-digital conversion on an output of the power detector.

10. The apparatus of claim 1, wherein the first antenna is located at least a first distance from the antenna array, and wherein the first distance is greater than a second distance between two adjacent antenna elements of the antenna array.

11. The apparatus of claim 1, the first antenna comprises the quasi omni-directional antenna element, wherein the quasi omni-directional antenna element comprises an antenna beam having a coverage angle and an antenna gain variation of less than a fixed amount across the coverage angle, the minimum of the coverage angle being 120 degrees.

12. The apparatus of claim 1, wherein the switch couples the first antenna to the transmitter via the splitter/combiner in response to selection of the first test mode and the switch couples the first antenna to the test circuit via the first TX/RX chain in response to selection of the second test mode.

13. A method comprising:
in response to selection of a second test mode:
transmitting an output radio frequency (RF) signal via an antenna array that is coupled to a first wireless device, the antenna array comprising a plurality of beamforming antenna elements coupled to a splitter/combiner via a plurality of beamforming transmit/receive (TX/RX) chains;
receiving an input RF signal corresponding to the output RF signal, the input RF signal received from a first antenna;
providing the input RF signal from the first antenna to a test circuit via a switch, wherein the switch selectively couples the first antenna either to the splitter/combiner or to the test circuit based on an operational mode via a first TX/RX chain, the first TX/RX chain being separate from the plurality of beamforming TX/RX chains and the operational mode comprising a transmit mode, a receive mode, a first test mode, and the second test mode, wherein the first test mode comprises a receive test mode and the second test mode comprises a transmit test mode;

in response to selection of the first test mode:
transmitting the output radio frequency (RF) signal via a first antenna that is coupled to the first wireless device, the first antenna comprising an omni-directional or quasi omni-directional antenna element, the omni-directional or quasi omni-directional antenna element being separate from the plurality of beamforming antenna elements of the antenna array and located outside a grid containing the plurality of beamforming antenna elements;
receiving the input RF signal corresponding to the output RF signal, the input RF signal received from the antenna array; and
providing the input RF signal from the antenna array to the splitter/combiner via the plurality of beamforming TX/RX chains.

14. The method of claim 13, wherein a test signal is generated by a transmitter, transmitted via the first antenna, received by the antenna array, and processed by a receiver in response to selection of the receive test mode.

15. The method of claim 13, wherein a test signal is generated by a transmitter, transmitted via the antenna array, received by the first antenna, and processed by the test circuit in response to selection of the transmit test mode.

16. The method of claim 13, the first antenna comprises the quasi omni-directional antenna element, wherein the quasi omni-directional antenna element comprises an antenna beam having a coverage angle and an antenna gain variation of less than a fixed amount across the coverage angle, the minimum of the coverage angle being 120 degrees.

17. An apparatus comprising:
means for generating an output radio frequency (RF) signal for transmission via an antenna array comprising a plurality of beamforming antenna elements coupled to a splitter/combiner via a plurality of beamforming transmit/receive (TX/RX) chains in response to selection of a second test mode;
means for receiving an input RF signal corresponding to the output RF signal from a first antenna in response to selection of the second test mode;
means for providing the input RF signal from the first antenna to a test circuit via a switch, wherein the switch selectively couples the first antenna either to the splitter/combiner or to the test circuit based on an operational mode via a first TX/RX chain, the first TX/RX chain being separate from the plurality of beamforming TX/RX chains and the operational mode comprising a transmit mode, a receive mode, a first test mode, and the second test mode in response to selection of the second test mode, and wherein the switch couples the first antenna to the transmitter via the splitter/combiner in response to selection of the first test mode and the switch couples the first antenna to the test circuit via the first TX/RX chain in response to selection of the second test mode;
means for transmitting the output radio frequency (RF) signal via a first antenna that is coupled to a first wireless device, the first antenna comprising an omni-directional or quasi omni-directional antenna element, the omni-directional or quasi omni-directional antenna element being separate from the plurality of beamforming antenna elements of the antenna array and located outside a grid containing the plurality of beamforming antenna elements in response to selection of the first test mode;
means for receiving the input RF signal corresponding to the output RF signal, the input RF signal received from the antenna array in response to selection of the first test mode; and
means for providing the input RF signal from the antenna array to the splitter/combiner via the plurality of beamforming TX/RX chains in response to selection of the first test mode.

18. The apparatus of claim 17, the first antenna comprises the quasi omni-directional antenna element, wherein the quasi omni-directional antenna element comprises an antenna beam having a coverage angle and an antenna gain variation of less than a fixed amount across the coverage angle, the minimum of the coverage angle being 120 degrees.

* * * * *